Sept. 17, 1929.  H. B. WATERS  1,728,381
FILTER BAG SUPPORT
Filed Jan. 18, 1929

Inventor
Harry B. Waters.
By A. J. O'Brien
Attorney

Patented Sept. 17, 1929

1,728,381

UNITED STATES PATENT OFFICE

HARRY B. WATERS, OF DENVER, COLORADO

FILTER-BAG SUPPORT

Application filed January 18, 1929. Serial No. 333,503.

This invention relates to improvements in filter bags for coffee urns.

In hotels and restaurants where a large amount of coffee is used, it is customary to prepare the same in specially prepared urns of a type which will be hereinafter described. The ground coffee is placed into a muslin bag whose open end is folded about a ring which serves to hold it in open position and to support it from a ledge within the urn. When the coffee filter bag is to be removed, the operator must be very careful because if he is not, the bag will become detached from the ring and fall into the coffee, thereby making it difficult to remove the bag and the coffee grounds, with the result that the coffee is oftentimes spoiled. Even if the bag does not slip from the ring, it is evident that it is rather difficult to handle the bag which is naturally very hot and therefore the changing of a filter bag becomes a disagreeable task.

It is the object of this invention to produce a simple handle and clamping device that can be readily attached to the ring and which will hold the filter bag from falling off the ring and which also facilitates the handling of the bag as will hereinafter be more fully described. With the ordinary arrangement of filter bags, it is not practical to remove the bag until the coffee within the urn has been withdrawn to such an extent that the bag no longer extends into the coffee. This oftentimes necessitates the retention of the coffee in the urn for a longer time than necessary to produce the best results and the coffee therefore becomes bitter. It is another object of this invention to produce means for lifting the bottom of the filter bag so as to raise the same above the level of the coffee so that grounds may drain and the filter bag and contents be removed without waiting for the level of the coffee to fall as much as is required by the present construction; and therefore there is less danger of the coffee becoming bitter as the grounds can be removed whenever desired.

The above and other objects which may become apparent as the description proceeds are attained by means of a construction and an arrangement of parts that will now be described in detail, reference for this purpose being had to the accompanying drawing in which the preferred embodiment of the invention has been illustrated, and in which.

Figures 1, 2:
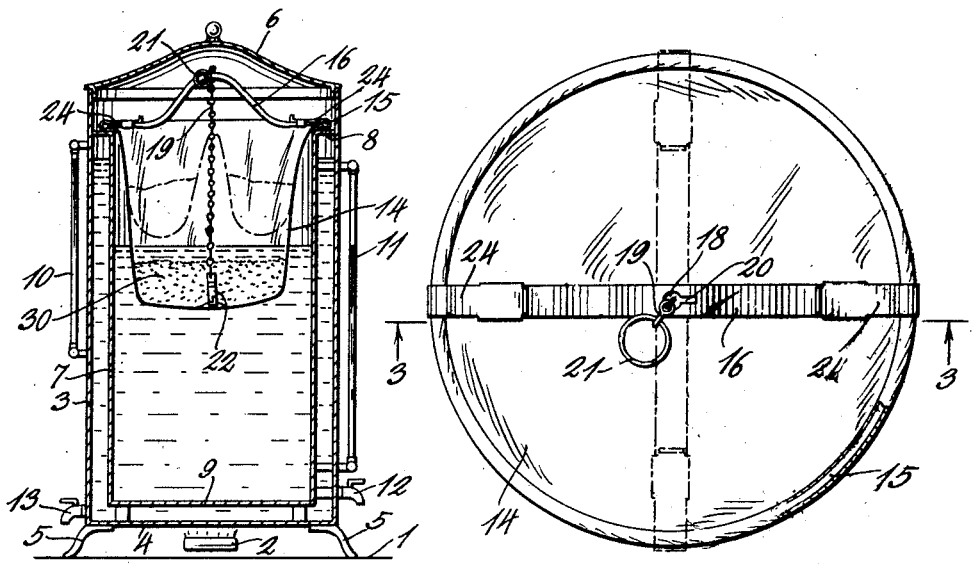
Fig. 1 is a section through a coffee urn showing my improved handle and clamping device attached to the filter bag.
Fig. 2 is a top plan view of the filter bag showing my improved handle and clamping device in place thereon.

In the drawing numeral 1 represents a table or other supporting surface on which the urn rests and 2 represents a gas burner. The urn is formed from a cylindrical can 3 whose bottom 4 is provided with a number of feet 5 by means of which it is supported. The upper end of the urn is closed by cover 6. Located within the can 3 is another cylindrical can 7 of somewhat smaller diameter. The upper end of can 7 is provided with an outwardly extending flange 8 that is soldered or otherwise secured to the inside of can 3 so as to form a steamtight connection. The bottom 9 of can 7 is spaced a short distance from the bottom 4 so as to provide a water jacket extending entirely around the smaller can. A water gauge 10 is connected with the water jacket space so that the level of the water in the water jacket can be determined at all times and the gauge 11 is connected with the inside of the smaller can 7 and serves to indicate the level of the coffee. A faucet 12 is connected with the coffee container and a similar faucet 13 is connected with the water space. This invention does not concern itself with the construction of the coffee urn as my invention can be used with any standard form of urn. The urn shown and described above is intended to represent a standard urn and has been shown merely for the purpose of more clearly describing my invention. The coffee is contained in a filter bag 14 whose open end is wrapped about a ring 15. This ring is somewhat larger in diameter than the container 7 and when the bag is in place in the manner shown in Fig. 1, it will be supported from the shoulder 8 by means of the ring through the clamping action produced by the weight of the bag and contents. In the usual construction this is the manner in which the filter bag is supported and it is therefore apparent that when the bag is to be removed, considerable care must be exercised to prevent the bag from slipping from the ring and falling into the coffee.

The combined handle and filter bag holder which forms the subject of this invention consists of a substantially rigid member having a central bowed portion 16 that connects the two axially aligned oppositely extending ends 17. The bowed portion 16 is provided with a key slot 18 through which the chain 19 extends. By bringing one of the links into the narrow portion 20 of the key slot, the chain can be anchored in any desired position. The upper end of the chain is provided with a ring 21 and the lower end is provided with a clasp 22, the purpose of which will hereinafter be more fully described. The ends 17 have their edges 23 folded over in the manner shown in Figs. 4 and 5 and slidably secured to these ends are clamping members 24. These clamping members have one end reversely bent in the manner indicated by reference numeral 5 so as to form a hook-like portion. The bend is formed on a radius so as to provide a somewhat enlarged space 26 like that shown in Fig. 4 which is adapted to receive the ring 15 and the upper end of the bag in the manner shown in Fig. 3. Clamps 24 have laterally extending integral portions 27 that are bent about the edges of the end 17 so as to secure the clamping members to the ends and to permit them to slide longitudinally thereon. The extreme ends of the handle are bent into hooks 28 that limit the outward movement of the clamping member and which prevent them from falling off from the handle. The inward movement is limited by the shoulder 29 shown most clearly in Fig. 3.

Figure 4:
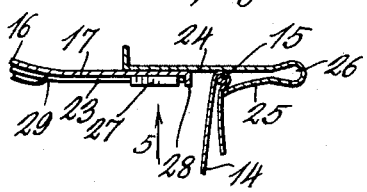
Fig. 4 is a section taken on line 4—4, Fig. 5, and shows the clamping members that are slidably connected with the ends of the handle.
Figure 5:
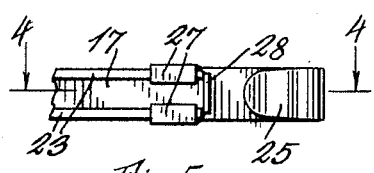
Fig. 5 is a view looking in the direction of arrow 5 in Fig. 4.
Figure 3:
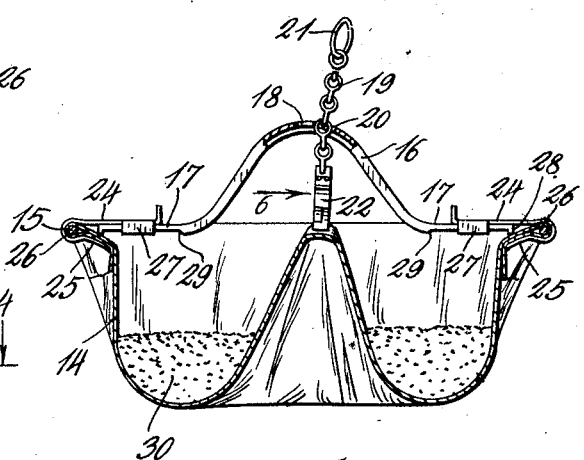
Fig. 3 is a section taken on line 3—3, Fig. 2, and shows the position of the parts when the center of the filter bag has been raised.
Figures 6, 7:
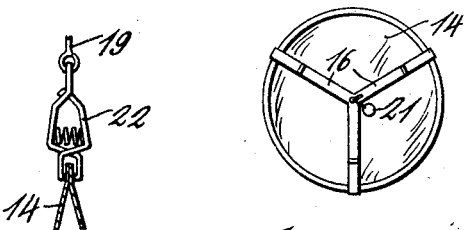
Fig. 6 is a view looking in the direction of arrow 6, Fig. 3 and shows the clasp employed for making connection with the bottom of the filter bag.
Fig. 7 is a top plan view of a filter bag showing the combined handle and filter bag holder formed with three arms.

When my improved handle and bag holder is to be applied, the filter bag is first put in place on the ring in the manner shown in Fig. 4, after which the clamping members 24 are positioned as shown and then these are forced inwardly until the ring is located in the position shown in Fig. 3. It is obvious that the clamping members will serve to hold the bag securely on the ring and that the filter bag can be carried by means of the handle. The clasp 22 is secured to the lower end of the bag in the manner shown in Figs. 1 and 3 and during the brewing of the coffee, the parts are in the position indicated by full lines in Fig. 1. When the coffee has been made, the operator grasps the ring 21 pulling the chain 19 upwardly thereby raising the bottom of the filter bag from the full line position shown in Fig. 1 to the dotted line position; the parts then assume the position shown in Fig. 3. When the bottom is pulled upwardly, the coffee grounds 30 which usually form quite a hard crust are stirred so as to break the crust and this permits the liquid to drip out more readily. After the parts have been in the position shown in Fig. 3 for a short time, the filter bag with its contents is removed from the urn. The handle can then be removed and applied to a clean filter bag. In the example illustrated I have shown by means of full lines a handle having only two clamping devices one at each end, but it is evident that two devices can be applied so as to form four clamping means in the manner indicated by full and dotted lines in Fig. 2 and it is also possible to make the handle with three arms in the manner shown in Fig. 7.

In the above description the holder has been described as provided with two clamping members, but it is of course possible to have only a single sliding member and have the other end of the handle provided with a hook integral with the handle, this will simplify the construction somewhat but will limit the amount of adjustment that can be made. Even where the holder has three arms, a sliding clamping member on one arm will be sufficient.

From the above description it will be apparent that I have produced a very simple device that can be readily applied to a filter bag and which serves both as a handle and as a means for securing the bag to the ring and which is also provided with means that is attached to the bottom of the bag and which serves to raise the bottom of the bag so as to break the crust and make it possible to more quickly remove the bag from the coffee. Although the clamping or securing devices have been shown as slidably attached to the ends of the handle, it is evident that they may be integral with the handle and the latter made in two parts which may be slidable one on the other.

Having described my invention what I claim as new is:

1. In a device of the class described, in combination, a ring, a filter bag having its open end draped over the ring, a combined holder and handle secured to the ring, and means carried by the ends of the holder for securing the bag to the ring.

2. In a device of the class described, in combination, a ring, a filter bag having its open end draped over the ring, a combined holder and handle secured to the ring, means carried by the ends of the holder for securing the bag to the ring, and means extending downwardly from the holder and secured to the bottom of the bag for raising the latter.

3. A combined handle and filter bag holder comprising, in combination, a substantially rigid member, a hook-like clamping device slidably secured to each end of said rigid member and means for limiting the movement of the clamping devices.

4. A combined handle and filter bag holder comprising, in combination, a substantially rigid member having a bowed center portion provided with an opening, a hook-like clamping member slidably secured to each end of the holder, means for limiting the movement of the clamping members, a flexible member extending through the opening in the rigid member and means carried by the flexible member for attaching it to the bottom of a filter bag.

5. A combined handle and filter bag holder comprising, in combination, a substantially rigid handle member whose central portion is bowed and whose ends are substantially co-axial and extended in opposite directions, a clamping member slidably connected with each end, said clamping members having a hook-like portion of resilient material adapted to embrace a filter bag ring and means for limiting the movement of the clamping members.

6. A combined handle and filter bag holder comprising, in combination, a substantially rigid handle member whose central portion is bowed and whose ends are substantially co-axial and extend in opposite directions, a clamping member slidably connected with each end, said clamping members having a hook-like portion of resilient material adapted to embrace a filter bag ring, means for limiting the movement of the clamping members, the bowed portion of the handle having an opening, a flexible member passing through the opening a clasp secured to one end of the flexible member and means for holding the flexible member in adjusted position.

7. In a device of the class described, in combination, a ring, a filter bag having its open end folded over the ring, a handle provided at its ends with means for securing it to the ring and for holding the bag in place on the ring and means for adjusting the distance between the securing devices so as to adapt the handle for use with rings of different sizes.

8. A device, of the class described, comprising, in combination, a handle, adapted to be attached to a ring, securing means carried by the ends of the handle, said means being adapted to engage the ring, and means for adjusting the distance between the securing devices.

9. A handle adapted to be attached to a ring for holding a filter bag in place thereon, said handle having a bowed center portion, hook-like securing devices carried by the ends of the handle, and means for varying the distance between the securing devices.

10. A handle adapted to be attached to a ring for holding a filter bag in place thereon, said handle having a bowed center portion, hook-like securing devices carried by the ends of the handle, means for varying the distance between the securing devices and a flexible member adjustably secured to the handle, one end of said member having means for attaching it to the bottom of a filter bag.

In testimony whereof I affix my signature.

HARRY B. WATERS.